US008620259B2

(12) United States Patent
Wullert, II et al.

(10) Patent No.: US 8,620,259 B2
(45) Date of Patent: Dec. 31, 2013

(54) MODEL-DRIVEN SERVICE CREATION AND MANAGEMENT

(75) Inventors: John R. Wullert, II, Martinsville, NJ (US); Munir Cochinwala, Basking Ridge, NJ (US); Hyong Sop Shim, Basking Ridge, NJ (US)

(73) Assignee: TTI Inventions C LLC, Wilmington, DE (US)

( * ) Notice: Subject to any disclaimer, the term of this patent is extended or adjusted under 35 U.S.C. 154(b) by 2159 days.

(21) Appl. No.: 11/170,481

(22) Filed: Jun. 29, 2005

(65) Prior Publication Data

US 2007/0002751 A1    Jan. 4, 2007

(51) Int. Cl.
*H04M 11/00*    (2006.01)

(52) U.S. Cl.
USPC ............ 455/406; 455/405; 455/423; 455/446

(58) Field of Classification Search
USPC .................................. 455/405, 406, 423, 446
See application file for complete search history.

(56) References Cited

U.S. PATENT DOCUMENTS

| 5,799,153 | A   | * | 8/1998  | Blau et al. ..................... 709/223 |
| 5,917,831 | A   |   | 6/1999  | Kätker et al. ................. 371/20.1 |
| 5,953,533 | A   |   | 9/1999  | Fink et al. ...................... 395/712 |
| 5,960,196 | A   |   | 9/1999  | Carrier, III et al. ........... 395/701 |
| 5,999,740 | A   |   | 12/1999 | Rowley .......................... 395/712 |
| 6,009,525 | A   |   | 12/1999 | Horstmann ................... 713/200 |
| 6,400,689 | B1  | * | 6/2002  | Sato et al. ..................... 370/242 |
| 6,529,729 | B1  | * | 3/2003  | Nodoushani et al. ......... 455/419 |
| 6,694,370 | B1  |   | 2/2004  | Bischof et al. ................ 709/229 |
| 6,701,514 | B1  |   | 3/2004  | Haswell et al. ............... 717/115 |
| 6,721,747 | B2  |   | 4/2004  | Lipkin ............................ 707/10 |
| 6,721,749 | B1  |   | 4/2004  | Najm et al. ................... 707/100 |
| 6,847,970 | B2  |   | 1/2005  | Keller et al. .................. 707/100 |
| 7,280,529 | B1  | * | 10/2007 | Black et al. ................... 370/352 |
| 7,333,810 | B2  | * | 2/2008  | Preiss et al. ............... 455/432.3 |
| 7,339,913 | B2  | * | 3/2008  | Chou et al. .................... 370/338 |
| 2004/0103071 | A1 | * | 5/2004  | Kalia et al. ..................... 706/26 |
| 2005/0055224 | A1 | * | 3/2005  | Lobo et al. ....................... 705/1 |
| 2006/0015617 | A1 | * | 1/2006  | Castro et al. .................. 709/226 |

OTHER PUBLICATIONS

Christian Ensel et al, "Managing Application Service Dependencies with XML and the Resource Description Framework", Proceedings of the *7th IEEE/IFIP International Symposium on Integrated Network Management (IM 2001)*, Seattle, WA, USA, May 2001, pp. 1-14, IEEE Press.

(Continued)

*Primary Examiner* — Kamran Afshar
*Assistant Examiner* — Shahriar Behnamian
(74) *Attorney, Agent, or Firm* — Fitch, Even, Tabin & Flannery LLP

(57) ABSTRACT

A method and apparatus for implementing new services is disclosed whereby a model of the system implementing a new service is created by a function referred to herein as a Service Designer and then different views of the service from the perspective of individual OSS subsystems are published at a Service Hub for use in configuring new services. When a request for service arrives at a subsystem in the network, such as an ordering system, that subsystem will illustratively request a view of the service from the Service Hub. This view is representative of the interfaces and attributes common between the requesting subsystem and other network components, with interfaces to the requesting subsystem. The requesting subsystem then uses this view to transmit values of attributes that are defined to be communicated between the requesting subsystem and other network components.

42 Claims, 8 Drawing Sheets

(56) References Cited

OTHER PUBLICATIONS

A. Brown et al, "An Active Approach to Characterizing Dynamic Dependencies for Problem Determination in a Distributed Environment", Proceedings of the *7th IEEE/IFIP International Symposium on Integrated Network Management (IM 2001)*, Seattle, WA, USA, May 2001, pp. 1-14, IEEE Press.

Guatam Kar et al, "An Architecture for Managing Application Services Over Global Networks", Proceedings of the *Twentieth Annual Joint Conference of the IEEE Computer and Communications Societies (IEEE INFOCOM 2001)*, Anchorage, AK, USA, Apr. 2001, pp. 1-8.

Alexander Keller, et al, "Dynamic Dependencies in Application Service Management", Proceedings of the *2000 International Conference on Parallel and Distributed Processing Techniques and Applications (PDTA 2000)*, Las Vegas, NV, USA, Jun. 2000, pp. 1-7.

G. Kar et al, "Managing Application Services Over Service Provider Networks: Architecture and Dependency Analysis", Proceedings of the *Seventh IEEE/IFIP Network Operations and Management Symposium (NOMS 2000)*, Honolulu, HI, USA, Apr. 2000, pp. 1-14.

Liliana Ardissono et al, "A Framework for the Development of Personalized, Distributed Web-Based Configuration Systems", American Association for Artificial Intelligence, Menlo Park, CA, AI Magazine, vol. 24, Issue 3, pp. 93-108, Sep. 2003.

K. Cheng et al, "Efficient Model-Driven Service Brokering Using Web Services", Proceedings of 2004 IEEE ICWS, pp. 622-629, Jul. 2004.

\* cited by examiner

MODEL-DRIVEN SERVICE CREATION AND MANAGEMENT

BACKGROUND OF THE INVENTION

As complex converged telecommunication networks designed to provide a wide range of services to customers become more prevalent, the need for integrating new services in a timely manner becomes increasingly important. Operations support systems (OSSs) in telecommunication systems have many different elements that require frequent updates and improvements when new services are introduced to customers. Such OSSs typically include order management, design and engineering, carrier interconnection, service provisioning, inventory, service activation, billing, customer care and service assurance subsystems. These subsystems are able to interact with each other and with various network elements and also must be able to accept input from and provide information to external elements, such as sales, engineering and technician personnel. Accordingly, such systems are complex and require careful configuration control.

OSSs are typically linked in a logical fashion to ensure that appropriate software interfaces exist between software modules in the systems and that the data transferred across those interfaces conforms to predefined standard formats. When a new service is introduced into the network, in many cases new functionality in the form of new hardware and new software must be added to various existing OSS components. However, especially when this functionality is provided by different vendors, the definition, development and deployment of such new services can significantly delay the introduction of those new services. This is because, in many cases, software code must be added to existing OSSs to support new functionality and/or interfaces to new systems. Additionally, extensive tests are typically required to verify that the data and functionality introduced for the new service conform to standard formats and that the operations of the new service conform to expectations. Such definition, development, deployment and testing are costly and time-intensive and, therefore, hinder the ability to rapidly introduce new services into a network.

SUMMARY OF THE INVENTION

While the prior methods of introducing new services into networks are advantageous in many aspects, they are also disadvantageous in some regards. Specifically, introduction of new services requires changes to the behaviors of the OSSs, the interfaces provided by the OSSs and the flow of information among them. Thus, it was frequently necessary to devote significant resources to define, develop and deploy the OSSs to support these new services, as well as to test every software interface and data scenario for providing the new service in the network. Thus, the process of implementing a new service was a costly and time intensive process that resulted in delays in the introduction of these new services.

The present invention substantially overcomes this limitation. Specifically, the present inventors have invented a method for introducing new services in telecommunication systems whereby a model of the system implementing the new service is created by a function referred to herein as a Service Designer. In one embodiment, the model is based on a meta-model that defines and restricts the types of services and the manner in which services can be represented. In another embodiment, users can use the Service Designer to define services by extending the meta-model objects with attributes and constraints and composing new services from existing services.

In yet another embodiment, views of the service model from the perspective of an individual OSS subsystem are then published at a Service Hub for use in configuring new services. The service model can then be used by OSS vendors to present interfaces for service deployment, can be used by the service hub to deploy the service across multiple OSSs for functionality such as provisioning, assurance and billing, as well as sub-service components that may be provided by different vendors or OSSs. When a request for service arrives at a subsystem in the network, such as an ordering subsystem, that subsystem will illustratively request a view of the service from the Service Hub. This view is representative of the functionality that the requesting subsystem must provide for the new service as well as the interfaces and attributes common between the requesting subsystem and other network components with interfaces to the requesting subsystem. In accordance with this embodiment, in response to this request, the Service Hub will transmit the respective view to the subsystem. The requesting subsystem then interprets this view to define its actions with respect to the new service and uses this view to transmit values of attributes that are defined to be communicated between the requesting subsystem and other network components. Accordingly, adding new services may not require any changes to the underlying software of the subsystems and, as a result, services may be introduced with a lower cost and shorter delay than traditionally associated with the definition, development, deployment and testing of those services.

These and other advantages of the present invention will be apparent to those of ordinary skill in the art by reference to the following detailed description and the accompanying drawings.

DETAILED DESCRIPTION OF THE INVENTION

A telecommunication system is generally composed of a set of operational subsystems, each of which implements some portion of the overall communication system service logic. Each operational subsystem consists of a set of input and output interfaces connected by internal logic defining the subsystem's operation. Interfaces on a subsystem enable the respective subsystem to receive and provide data from or to, respectively, an associated Operational Support System (OSS) environment, as discussed above. For example, a call agent or softswitch component of a voice over IP (VoIP) service may require some subset of service order data from an order management system in order to activate service for a subscriber. It may also need to provide usage data of individual subscribers to an ordering system for billing and auditing purposes.

Figure 1:
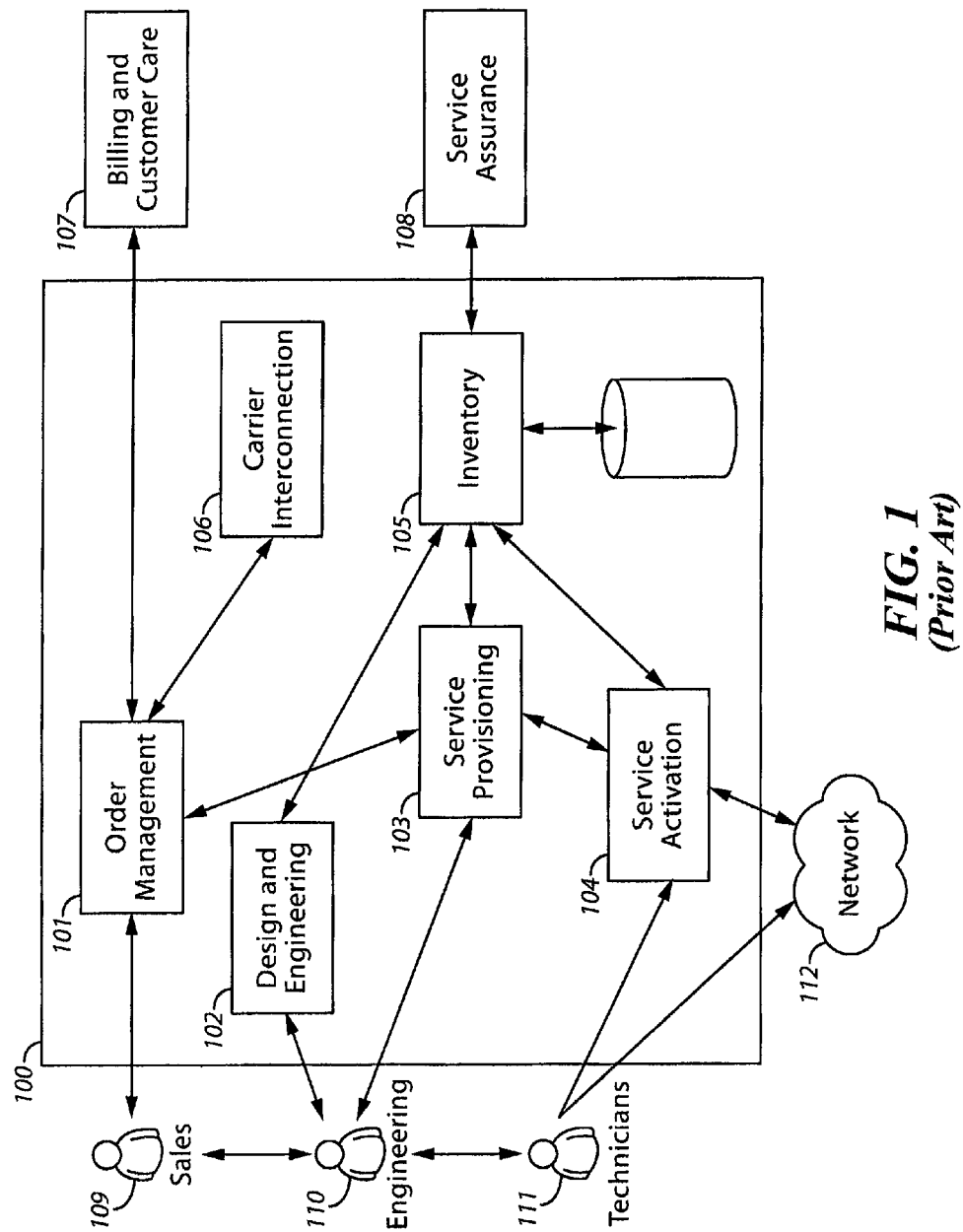
FIG. 1 shows a prior communications operational support system (OSS)

Such a component view of services can be extended to OSSs in that the subsystems of an OSS can be treated as distributed subsystems that communicate with each other via a set of input/output interfaces. These interfaces typically do not change from service to service. However, the data flowing between OSS subsystems frequently depends on the particular service. FIG. 1 shows an illustrative OSS associated with a telecommunication network. OSS 100 has, illustratively, order management subsystem 101, design and engineering subsystem 102, service provisioning subsystem 103, service activation subsystem 104, inventory subsystem 105, carrier interconnection subsystem 106, billing and customer care subsystem 107 and service assurance subsystem 108. Illustratively, sales departments/personnel 109 input information (e.g., sales) to the order management subsystem 101 and provide feedback (e.g., requests for improvement to the system) to engineering department 110. Engineering department 110, for example, performs system design and engineering functions using design and engineering subsystem 102, provisions services using service provisioning subsystem 103, and communicates activation and network configuration requirements to technicians 111. Technicians 111 perform the actual service activation functions using service activation subsystem 104 and configure network 112 according to system requirements such as those determined to be necessary by engineering department 110.

One skilled in the art will recognize that the different subsystems of the OSS of FIG. 1 are typically legacy systems that may have been in operation for a significant period of time. Each subsystem in the OSS may have been added or updated independently from other elements of the OSS and may have been developed by different suppliers. Thus, to introduce a new service in the OSS of FIG. 1, as discussed above, the definition, development, deployment and testing of such a new service is complex and, as a result, may significantly delay the introduction of the new service.

Figure 2:
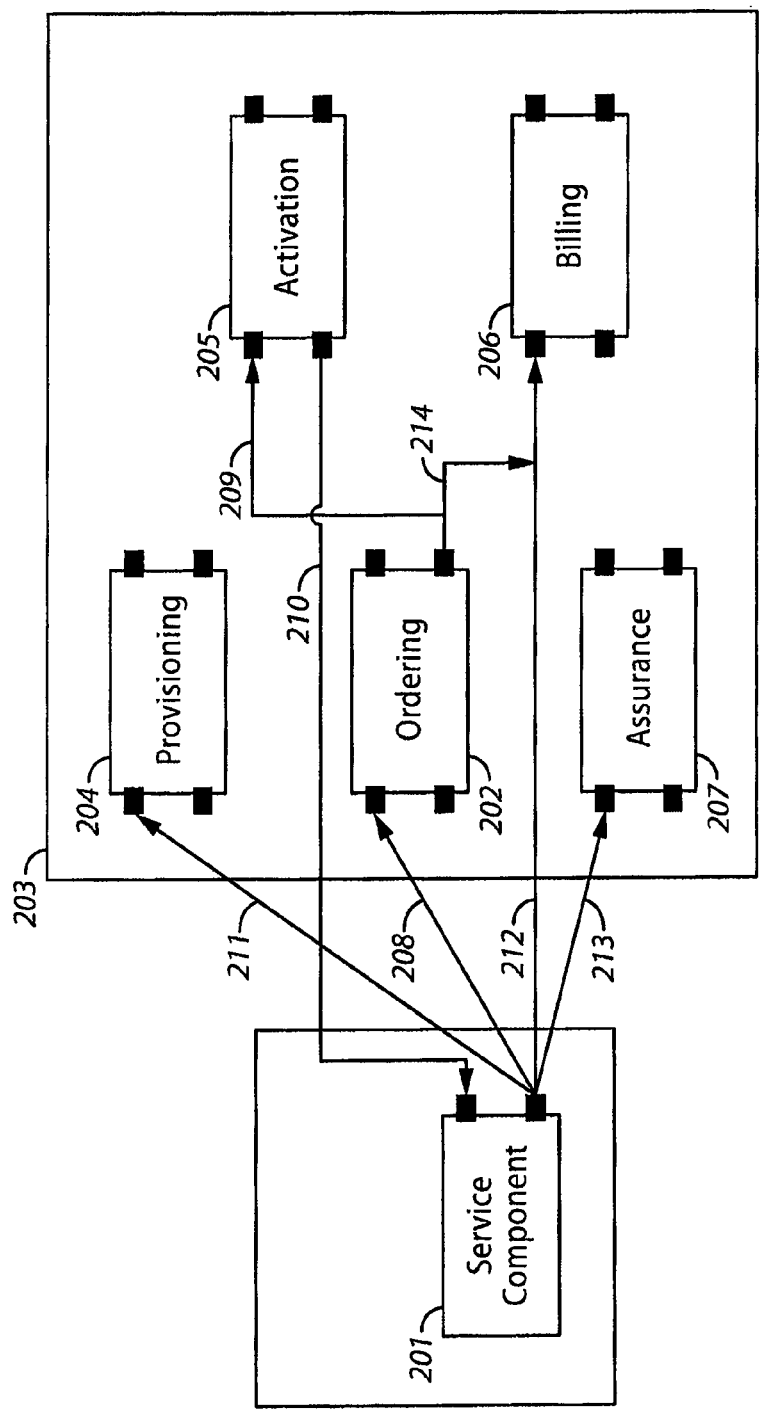
FIG. 2 shows another view of the OSS of FIG. 1.

Prior attempts at integrating new services have typically involved mapping the interfaces of an OSS subsystem to the interfaces of another OSS subsystem or an operational service subsystem. In one illustrative example of such a mapping, the well-known Web Services Description Language (WSDL) is used to define functions of the different OSS subsystems as a set of input and output parameters. The mapping of interfaces in such a system essentially is a mapping of a subset of output parameters of an interface at the source OSS subsystem to a subset of input parameters of an interface at the destination OSS subsystem or operational service subsystem. However, as one skilled in the art will recognize, the number of matches of output parameters to input parameters under every possible interworking scenario of OSS and/or operational service subsystems is very large, especially since different scenarios of the same service can generate different parameter matches. For example, FIG. 2 shows how various subsystems could interface with each other, thus generating a large number of potential parameter matches.

In the operations of this illustrative service, service component 201 must interface with the ordering subsystem 202 of OSS 203, as well as the provisioning subsystem 204, the activation subsystem 205, billing subsystem 206 and assurance subsystem 207. Specifically, service component 201 will send a request 208 to establish service to ordering subsystem 202 which then processes the order for a respective service. The ordering subsystem 202 then sends a message 209 to activation subsystem 205 in order to activate the service. Ordering subsystem 202 also sends a message 214 to billing subsystem to establish the billing records necessary to support the service. Once the service is activated (e.g., for a particular customer), activation subsystem 205 then sends a message 210 to service component 201 indicating, for example, that the service is now activated for that customer. One skilled in the art will recognize that the service component 201 must also interface with other subsystems in order to establish service. For example, service component 201 may illustratively send a message 211 to provisioning subsystem 204 to provision the necessary resources to support the providing of a service. Additionally, service component 201 may send messages 212 and 213 to the billing subsystem 206 and the assurance subsystem 207, respectively in order to bill and ensure that an adequate level of performance is maintained. Each of the above-mentioned messages between the subsystems of the OSS and/or service component 201 requires numerous output parameters from one subsystem to be matched to numerous input parameters of another subsystem. The output and input parameters can change depending on the service and/or the subsystems involved. Thus, such a mapping is difficult and, frequently, error prone.

Figure 3:
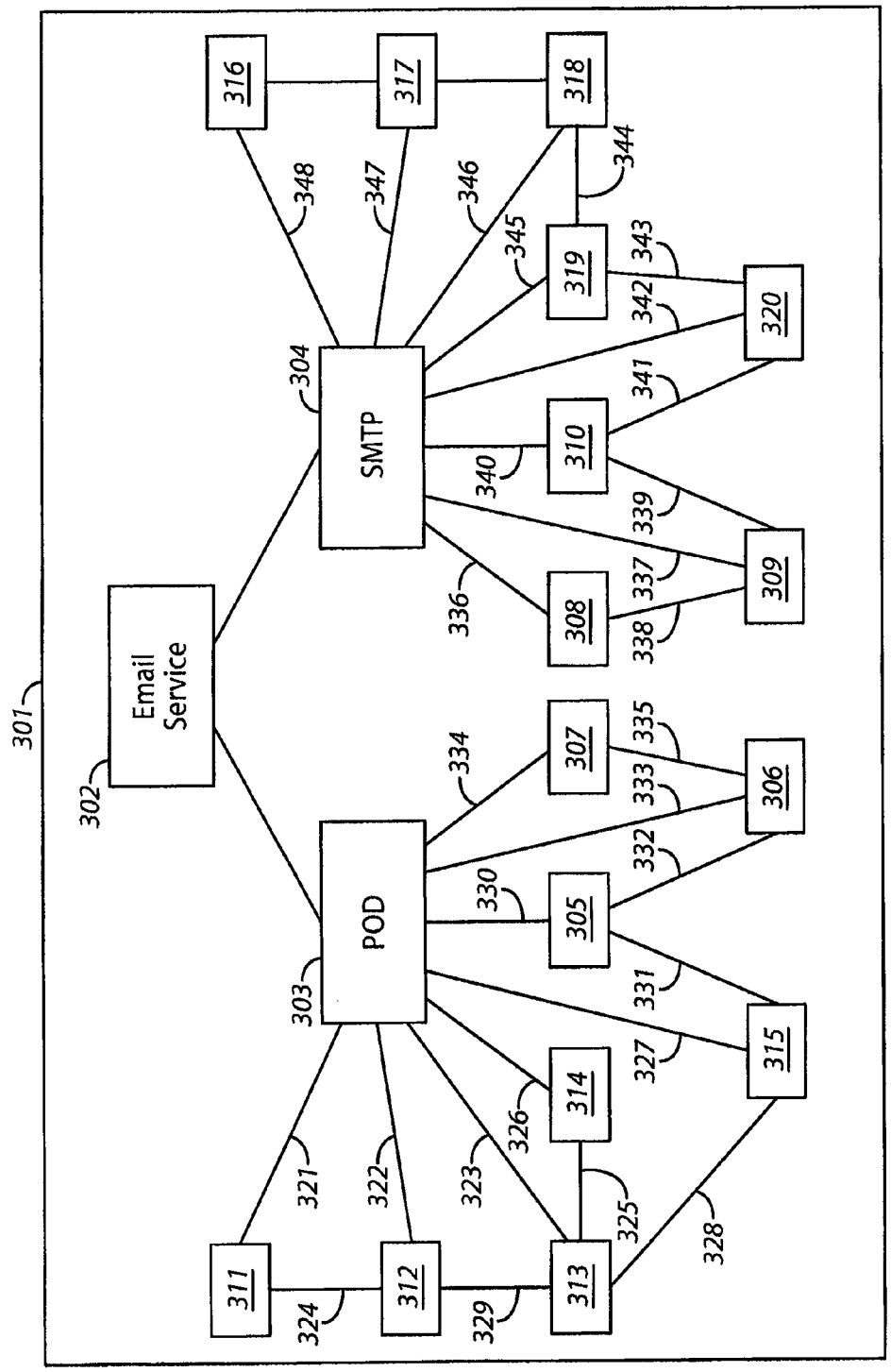
FIG. 3 shows an illustrative Service Designer model of an illustrative email service in accordance with the principles of the present invention.
Figure 4:
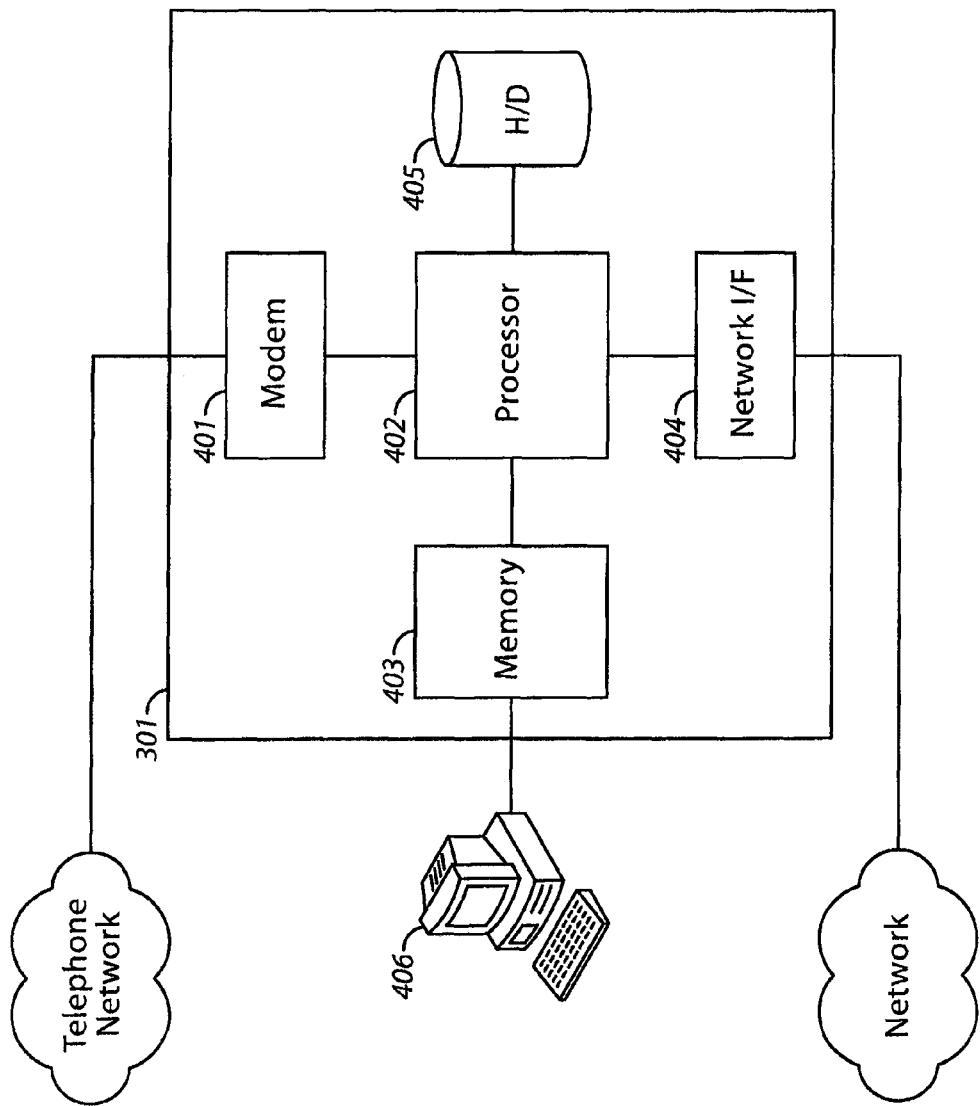
FIG. 4 shows the illustrative components of the Service Designer of FIG. 3.

The present invention substantially overcomes these problems. Specifically, the present inventors have invented a method and apparatus for implementing new services whereby a model of the system implementing the new service is created by a function referred to herein as a Service Designer and then different views of that service from the perspective of individual OSS subsystems are published at a Service Hub for use in configuring new services. FIG. 3 shows a display of a Service Designer 301 in accordance with the principles of the present invention. Specifically, the display of Service Designer 301 is a graphical display operating, for example, on a well-known personal computer, for creating and managing service dependency models and other attributes of the system necessary to provide a service. FIG. 4 shows an illustrative Service Designer 301 that has, for example, a processor 402 (or multiple processors) which controls the overall operation of the Service Designer 301. Such operation is defined by computer program instructions stored in a memory 403 and executed by processor 402. The memory 403 may be any type of computer readable medium, including without limitation electronic, magnetic, or optical media. Further, while one memory unit 403 is shown in FIG. 4, it is to be understood that memory unit 403 could include multiple memory units, with such memory units being of any type of memory. Service Designer 301 also includes modem 401 and network interface 404. Service Designer 301 further includes a storage medium, such as a computer hard disk drive 405 for storing, for example, data and computer programs adapted for use in accordance with the principles of the present invention as described hereinabove. Finally, Service Designer 301 includes one or more input/output devices, represented in FIG. 4 as terminal 406, for allowing interaction with, for example, a service provider technician or database administrator. One skilled in the art will recognize that Service Designer 301 is merely illustrative in nature and that various hardware and software components may be adapted for equally advantageous use in a computer in accordance with the principles of the present invention.

Referring once again to FIG. 3, the term "service dependency" is used herein to refer to the interaction and dependency between a particular service and other services and resources. The Service Designer 301 is used to graphically represent each of these interactions and dependencies; for example, as a tree structure with lines connecting the various interfaces of services and network components. Such a graphical representation can be extensive, potentially including every subsystem, component, subcomponent, interface and service that a particular service depends upon. For example, FIG. 3 shows an illustrative simple Service Designer representation of an e-mail service 302. Specifically, e-mail service 302 may consist of a post office protocol (POP) server 303 and a simple mail transfer protocol (SMTP) server 304. Each of these servers may run a number of processes, for example, processes 305-310 for processing and receiving/sending e-mail messages. In addition, each of these servers may rely on various hardware components, such as server hardware components. For example, POP server 303 may consist of CPU 311, motherboard 312, power supply 313, storage 314, and network interface 315. Similarly, SMTP server 304 may consist of CPU 316, motherboard 317, power supply 318, storage 319 and network interface 320. Once the physical and logical layout of the various subsystems, hardware components and services is graphically represented, then attributes can be associated with the service. For example, one necessary attribute of an e-mail service is, illustratively, the e-mail address of a subscriber to the service. Another attribute could be the amount of storage the customer is allocated on the e-mail servers associated with the service. Similarly, other attributes associated with the service could be the amount of power to be supplied by power supplies 313 and 318, as well as other attributes of the physical hardware necessary to run both the POP server 303 and the SMTP server 304. In this simplistic view the interfaces between the components and processes are logical connections, represented by lines 321 to 348, in order to show the potential interactions (e.g., data flow) between the components and processes.

Once the service has been graphically modeled and assigned attributes in the Service Designer of FIG. 3, the relationships between various subsystems and services, as well as the attributes to be forwarded or received to/from the various subsystems and services upon which that service depends, will have been defined. In one embodiment according to the principles of the present invention, different "views" of the service are then transferred, or "published" to another subsystem in the system, referred to herein as a Service Hub. As used herein, a view of a service is defined as a logical representation of that service that contains information related to the interfaces between, for example, a particular OSS subsystem and other various subsystems and services, and the attributes that are to be received from each of those subsystems and services. Such a view is specific to a particular operational subsystem or OSS subsystem and represents the operations of the service from the perspective of that particular operational subsystem or OSS subsystem.

In accordance with one embodiment of the present invention, a service model is subject to one or more constraints or rules, referred to as a "meta-model." As used herein, the term meta-model is defined as an explicit model of the rules needed to build service models and views of such service models, as described above. A model for a particular service inherits the rules from the meta-model and specifies rules for the service as well as any other related services that are required for operation of the particular service. For example, a secure e-mail service may require, illustratively, the e-mail service of FIG. 3 as well as a Virtual Private Network (VPN) service to provide a secure connection between a user and either POP server 303 or SMTP server 304. In such a case, the model for a secure e-mail service would contain a constraint that specifies that, whenever the secure e-mail service was ordered or invoked, both the e-mail service of FIG. 3 and the VPN service would be required to invoke the secure email service.

In accordance with the principles of the present invention, when service models are created by the Service Designer, views for each service and all related or dependent services and resources will also be published to the Service Hub. Thus, when a view of the model is retrieved from the Service Hub, as described above, all dependent services will also be available for use in providing the service. Since the model specifies the relationship between the service and related services and resources, when a desired view of a service is requested, the requesting party need not request those additional views. Instead, the Service Hub will iteratively determine and provide as required the supported services or resources for a given service. As one skilled in the art will recognize, using the above approach to identify and maintain relationships between various services and resources permits the support of other services with no modification. Specifically, for any new service that complies with the specified model/constraints, the Service Hub will then manage the distribution of the related services. This is especially advantageous for providing services using related services and resources from a variety of vendors. As long as the services comply with the established model, those services can integrate seamlessly with other services, avoiding extensive service definition, development and deployment delays.

One skilled in the art will recognize that this capability to construct services and views of services from constituent related services and resources simplifies substitution of one service for another, or the substitution of a different version of the same service for another version. For example, a specific service could have multiple versions of views based on the different functionalities of that service that could require correspondingly different related services or resources.

Figure 5:
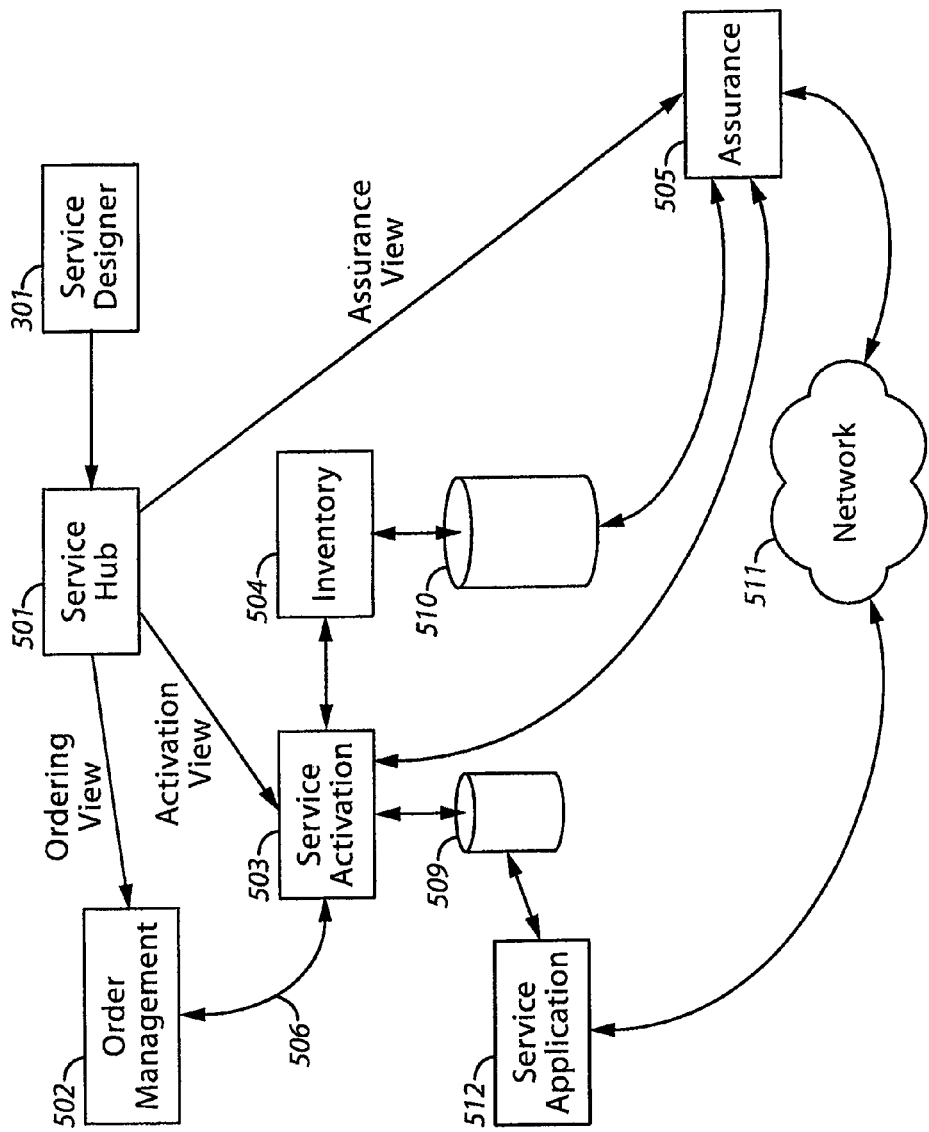
FIG. 5 shows how a service hub can distribute views of the model of FIG. 3 to the components of an OSS.
Figure 6:
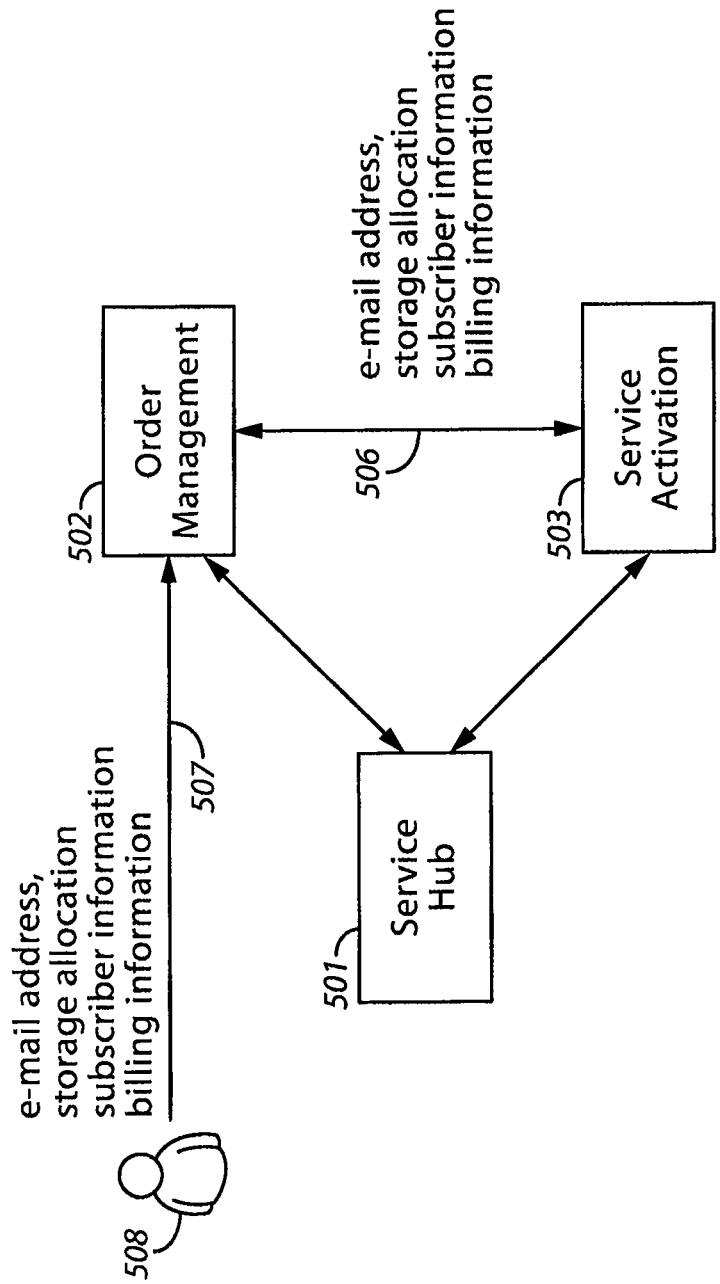
FIG. 6 shows a view of the model of FIG. 3 from the perspective of an order management subsystem.

FIG. 5 shows a network in accordance with the principles of the present invention in which a Service Designer 301 is used to graphically model a service and is then used to publish different views to a Service Hub 501. Service Hub 501 illustratively is a personal computer having components similar to the components of Service Designer 301, as discussed above in relation to FIG. 4. Service Hub 501 functions to facilitate the exchange of data between the Service Designer 301 and various OSS components, such as order management subsystem 502, service activation subsystem 503, inventory subsystem 504 and assurance subsystem 505. As such, Service Hub 501 is a repository of service models and OSS-dependent views in a way such that these views are available to OSS subsystems for use in their operations. For example, the Service Designer 301 may publish a view of the e-mail service of FIG. 3 that is specific to the order management subsystem 502. FIG. 6 shows the view of such a service from the perspective of the order management subsystem 502. Specifically, FIG. 6 shows that order management system 502 has an interface 506 to service activation subsystem 503, interface 507 to customers, represented here by customer 508, and various attributes that order management subsystem 502 can expect to receive and/or transmit across these interfaces. As shown in FIG. 6, these attributes include (possibly among others) e-mail address, storage allocated to a user, subscriber information of a user and billing information of a user. In operations, when a customer, such as customer 508, wishes to order e-mail service, that customer will illustratively visit a Web page provided by order management subsystem 502. When a customer selects to subscribe to the e-mail service, the order management subsystem 502 will display, for example, a form on the Web page displaying illustratively fields corresponding to at least some of the attributes dictated by the view for the order management subsystem 502 that was published to the Service Hub 501. For example, the Web form may request the user select an e-mail address, select how much storage that user wishes to have and pay for, other subscriber information (such as full name, address and other associated information), and billing information (such as credit card number, billing address and other subscription related information). One skilled in the art will recognize that any of the above information may be automatically established by the order management subsystem 502 and, therefore, may be omitted form the Web form presented to the customer. For example, the storage allocation may be preestablished and, as a result, the customer may not be presented with an option to select how much storage is desired.

Figure 7:
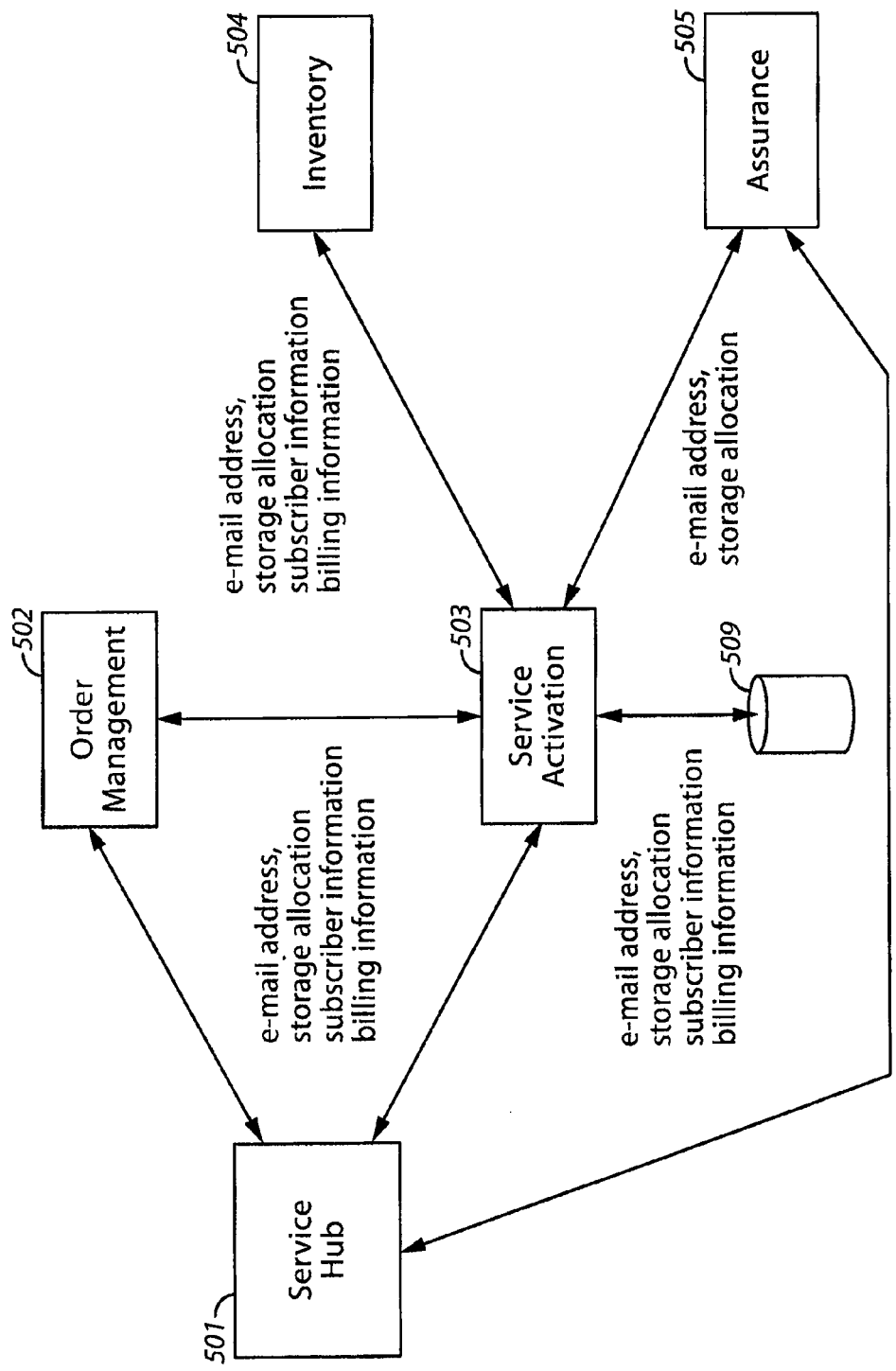
FIG. 7 shows a view of the model of FIG. 3 from the perspective of a service activation subsystem.

The Service Hub 501 in FIG. 5 also contains a published view of the e-mail service specific to the service activation subsystem 503. Specifically, referring to FIG. 7, the service activation subsystem 503 view will indicate that service activation subsystem 503 has interfaces with the order management subsystem 502, the inventory subsystem 504, assurance subsystem 505 and service database 509. The role of the service activation subsystem 503 is to "turn on" a service for, illustratively, customer 508 in FIG. 5. Thus, service activation subsystem 503 will retrieve its view from the Service Hub 501, which will indicate those attributes that are to be received from or transmitted to the other subsystems that interface with subsystem 503. In the case of the example of FIG. 5, Service Hub 501 publishes a view from the service activation subsystem 503 perspective that indicates that the order management subsystem 502 will transmit to service activation subsystem 503 various attributes including the email address of the subscriber, other subscriber information, the billing information of the subscriber, and the storage allocated to the subscriber. The service activation subsystem 503 can then establish the service by creating the necessary records in service database 509 as well as transmitting information required by the published view to other subsystems in the OSS. For example, the same attributes transmitted to the service activation subsystem 503 (e-mail address, storage allocation, subscriber and billing information) could be transmitted to inventory subsystem 504 and service database 509, while possibly only the e-mail address and storage allocation could be transmitted to assurance subsystem 505. Service application subsystem 512 can then, for example, refer to service database 509 in order to provide e-mail service across network 511.

Referring once again to FIG. 5, one skilled in the art will recognize in light of the foregoing that many other views may be published to Service Hub 501 and used by various subsystems of the OSS. For example, the assurance subsystem 505 may also have a service-specific view representing the service from the perspective of the assurance subsystem 505. Specifically, the assurance subsystem 505 specific view may include interfaces to an inventory database 510, the service activation subsystem 503 and network 511. Attributes that are to be received from service activation subsystem 503, for example, may include e-mail address and storage allocation assigned to customer 508. In addition, assurance subsystem 505 might receive other attributes from inventory database 510, such as power supply status, motherboard status and CPU status that are retrieved from POP server 303 and SMTP server 309 and stored in inventory database 510. Assurance subsystem 505 may use this information to monitor e-mail hardware and processes to ensure that the e-mail service is functioning as expected.

The attributes associated with a view are not always variable. In fact, in many situations, the attributes that are to be transmitted from one subsystem to another may never change. For example, instead of an order management subsystem view that includes the variable attributes of e-mail address, storage allocation, subscriber information and billing information, as discussed above, such a view could establish a preset storage allocation and could contain a predetermined domain name portion of the e-mail address. One skilled in the art will recognize how such attributes can be implemented in either a constant or variable fashion. One skilled in the art will also recognize that the greater the number of constant variables, the lower the network resources that are necessary to transmit and maintain the values associated with such variables.

Figure 8:
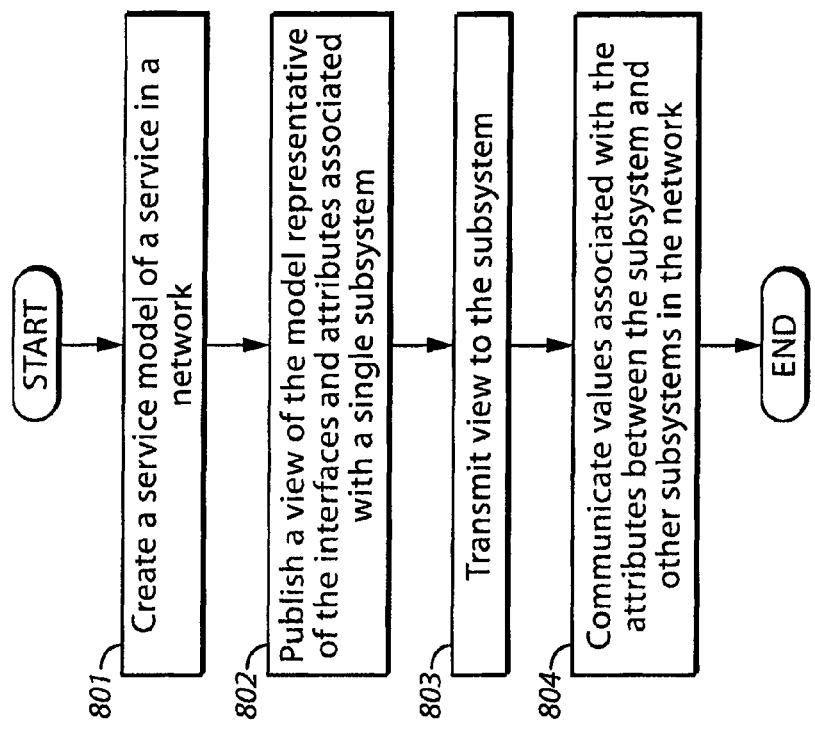
FIG. 8 shows a flow chart representing the steps of a method in accordance with the principles of the present invention.

FIG. 8 shows a method representing the steps of one method in accordance with the principles of the present invention. Specifically, at step 801, a service model is created, illustratively by the Service Designer 301 of FIG. 5. At step 802, views of that model are published to a service hub such as Service Hub 501 in FIG. 5. These views, as discussed above, represent the interfaces and attributes associated with a particular subsystem. Next, at step 803, these views are then transmitted to subsystems in a network. Finally, these subsystems communicate values associated with those attributes to other subsystems.

The ability to define multiple views of a service on a service model, such as is created by the Service Designer 301 of FIG. 5, is desirable to facilitate seamless data transfer between the subsystems of a distributed management system, such as the OSS subsystems discussed herein above. Specifically, such an attribute and interface modeling of services facilitates the integration of new services by updating only service model attributes and interfaces when a new service is introduced with no new changes to the actual underlying software. As a result, for example, new services by different vendors may be quickly and seamlessly integrated with each other, reducing the definition, development and deployment delays typically associated with such an introduction.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the present invention.

The invention claimed is:

1. An apparatus for modeling a service in a network, the apparatus comprising:
 a design part configured to create a model of the service, the model including service information comprising logical operational subsystems of the network associated with effecting the service in the network; and
 a communication part configured to output representations of a plurality of views of the model in response to a request from a respective subsystem in the network that is implementing a new or modified service, wherein individual ones of the plurality of views are associated with the respective subsystem in the network and include portions of the service information specific to the respective subsystem to effect the service,
 wherein individual ones of the plurality of views are representative of a functionality that the respective subsystem provides as well as interfaces and attributes common between the respective subsystem and other network components with interfaces to the respective subsystem, and wherein the individual ones of the plurality of views are configured for use by the respective subsystem:

to interpret the individual ones of the plurality of views to define actions of the respective subsystem with respect to the new or modified service to define attributes to be communicated between the respective subsystem and the network, and to determine integration of the new or modified service at the respective subsystem with respect to the network.

2. The apparatus for modeling a service as claimed in claim 1, wherein the model is based on a meta-model which defines and restricts services to be modeled and associated views.

3. The apparatus for modeling a service as claimed in claim 1, wherein the service information includes information on related services which are effected upon the service being effected, wherein the design part is configured to model the service information based on related services provided by different vendors.

4. The apparatus for modeling a service as claimed in claim 1, wherein the interfaces are defined as common interfaces between the respective subsystem and additional components in the network, wherein the design part is configured to model the service information based on additional components provided by different vendors.

5. The apparatus for modeling a service as claimed in claim 4, wherein the attributes are defined as attributes transferred between the respective subsystem and the additional components.

6. A service hub in a network, the service hub comprising:
a memory unit configured to store a plurality of views of a model for a service, wherein the model includes service information comprising logical operational sub-systems of the network associated with effecting the service in the network, wherein individual ones of the plurality of views are associated with a respective subsystem in the network and include portions of the service information specific to the respective subsystem to effect the service, and wherein individual ones of the plurality of views are representative of a functionality that the respective subsystem provides as well as interfaces and attributes common between the respective subsystem and other network components with interfaces to the respective subsystem; and a communications part configured to transmit at least one of the plurality of views to the respective subsystem in response to a request from the respective subsystem in the network that is implementing a new or modified service, and wherein the at least one of the plurality of views is configured for use by the respective subsystem:

to interpret the at least one of the plurality of views to define actions of the respective subsystem with respect to the new or modified service to define attributes to be communicated between the respective subsystem and the network, and to determine integration of the new or modified service at the respective subsystem with respect to the network.

7. The service hub in a network as claimed in claim 6, further comprising a second communication part configured to receive the plurality of views of the model.

8. The service hub in a network as claimed in claim 6, wherein the model is based on a meta-model which defines and restricts services to be modeled and associated views.

9. The service hub in a network as claimed in claim 6, wherein the service information includes information on related services which are effected upon the service being effected, wherein the model is based part on related services provided by different vendors.

10. The service hub in a network as claimed in claim 6, wherein the communication part is configured to receive a request from the respectively associated subsystem prior to transmitting the one of the plurality of views.

11. The service hub in a network as claimed in claim 6, wherein the interfaces are defined as common interfaces between the respective subsystem and additional components in the network, wherein the model is based part on additional components provided by different vendors.

12. The service hub in a network as claimed in claim 11, wherein the attributes are defined as necessary attributes transferred between the respective subsystem and the additional components.

13. A subsystem in a network, the subsystem comprising:
a first communication part configured to receive at least one of a plurality of views of a model of a service from a service hub, wherein the at least one of a plurality of views includes service information comprising logical operational subsystems of the network specific to the subsystem for effecting the service in the network, the service information including interfaces and attributes common between the subsystem and other network components with interfaces to the subsystem, wherein the first communication part is configured to request the at least one view from the service hub in response to a request for implementation of a new or modified service at the subsystem;

a second communication part configured to effect the service via the interfaces and attributes; and a subsystem computing device in communication with the first communication part and the second communication part, the subsystem computing device configured to:
interpret the at least one of the plurality of views to define actions of the subsystem with respect to the new or modified service to define attributes to be communicated between the subsystem and the network, and determine integration of the new or modified service at the subsystem with respect to the network.

14. The subsystem in a network as claimed in claim 13, wherein the service information includes information on related services which are effected upon the service being effected, wherein the service information includes related services provided by different vendors.

15. The subsystem in a network as claimed in claim 13, wherein the interfaces are defined as common interfaces between the subsystem and additional components in the network, wherein the service information includes additional components provided by different vendors.

16. The subsystem in a network as claimed in claim 13, wherein the subsystem is configured to send a request, via the first communication part, to a service hub prior to receipt of the one of a plurality of views of the model from the service hub.

17. The subsystem of claim 13, wherein the subsystem is configured to interpret the at least one of a plurality of views to define the subsystem's actions with respect to a new service at the subsystem.

18. A method for modeling a service for use in a network, the method comprising:
   creating a model of the service, the model including service information comprising logical operational subsystems of the network associated with effecting the service in the network;
   storing the model;
   creating a plurality of views of the model, wherein individual ones of the plurality of views are associated with a respective subsystem in the network and include portions of the service information specific to the respective subsystem to effect the service, wherein the individual ones of the plurality of views are representative of a functionality that the respective subsystem provides as well as interfaces and attributes common between the respective subsystem and other network components with interfaces to the respective subsystem; and
   storing the plurality of views, and
   wherein the individual ones of the plurality of views are configured for use by the respective subsystem:
      to interpret the individual ones of the plurality of views to define actions of the respective subsystem with respect to the new or modified service to define attributes to be communicated between the respective subsystem and the network, and
      to determine integration of the new or modified service at the respective subsystem with respect to the network.

19. The method for modeling a service as claimed in claim 18, further comprising transmitting representations of the plurality of views of the model to a service hub in the network.

20. The method for modeling a service as claimed in claim 18, further comprising employing a meta-model upon which the model of the service is created, the meta-model defining and restricting services to be modeled and associated views.

21. The method for modeling a service as claimed in claim 18, wherein the service information includes information on related services which are effected upon the service being effected, wherein the service information includes related services provided by different vendors.

22. The method for modeling a service as claimed in claim 18, wherein the interfaces are defined as common interfaces between the respective subsystem and additional components in the network, wherein the service information includes additional components provided by different vendors.

23. The method for modeling a service as claimed in claim 18, wherein the attributes are defined as necessary attributes transferred between the respective subsystem and the additional components.

24. A method for employing a service in a network, the method comprising:
   storing a plurality of views of a model of a service, wherein the model includes service information comprising logical operational subsystems of the network associated with effecting the service in the network, and wherein individual ones of the plurality of views are associated with a respective subsystem in the network and include portions of the service information specific to the respective subsystem to effect the service, wherein the individual ones of the plurality of views are representative of the functionality that the respective subsystem provides as well as interfaces and attributes common between the respective subsystem and other network components with interfaces to the respective subsystem;
   receiving a request for a new or modified service at the respective subsystem;
   transmitting at least one of the plurality of views to the respective subsystem;
   the respective subsystem interpreting the at least one of the plurality of views to define actions of the respective subsystem with respect to the new or modified service to define attributes to be communicated between the respective subsystem and the network; and
   the respective subsystem determining integration of the new or modified service at the respective subsystem with respect to the network.

25. The method for employing a service as claimed in claim 24, further comprising receiving a request from the respectively associated subsystem prior to transmitting the one of the plurality of views.

26. The method for employing a service as claimed in claim 24, further comprising receiving the plurality of views of the model from a service model designing apparatus.

27. The method for employing a service as claimed in claim 24, wherein the service information includes information on related services which are effected upon the service being effected, wherein the service information includes related services provided by different vendors.

28. The method for employing a service as claimed in claim 24, wherein the interfaces are defined as common interfaces between the respective subsystem and additional components in the network, wherein the service information includes additional components provided by different vendors.

29. The method for employing a service as claimed in claim 28, wherein the attributes are defined as necessary attributes transferred between the respective subsystem and the additional components.

30. A method for effecting a service by a subsystem in a network, the method comprising:
   requesting at least one of a plurality of views of a model of a network service from a service hub;
   receiving the at least one of a plurality of views of a model of the network service at the subsystem, wherein the at least one of a plurality of views includes service information comprising logical operational sub-systems of the network specific to the subsystem for effecting the network service in the network, the service information including interfaces and attributes common between the subsystem and other network components with interfaces to the subsystem;
   the subsystem interpreting the at least one of a plurality of views to define actions of the subsystem with respect to a new or modified subsystem service and to determine integration of the new or modified service at the subsystem with respect to the network; and
   effecting the new or modified subsystem service via the interfaces and attributes of the at least one of a plurality of views.

31. The method for effecting a service by a subsystem in a network as claimed in claim 30, further comprising sending a request to a service hub in the network prior to receiving the at least one of a plurality of views of the model.

32. The method for effecting a service by a subsystem in a network as claimed in claim 30, wherein the service information includes information on related services which are effected upon the service being effected, wherein the service information includes related services provided by different vendors.

33. The method for effecting a service by a subsystem in a network as claimed in claim 30, wherein the interfaces are defined as common interfaces between the subsystem and additional components in the network, wherein the service information includes additional components provided by different vendors.

34. The method for effecting a service by a subsystem in a network as claimed in claim 33, wherein the attributes are defined as attributes transferred between the subsystem and the additional components.

35. The method of claim 30, further comprising interpreting the at least one of a plurality of views to define the subsystem's actions with respect to a new service at the subsystem.

36. A tangible computer-readable medium having stored thereon, computer-executable instructions that cause a computing device to perform operations comprising:
   receipt from at least one subsystem at a computing device of service information comprising logical operational subsystems of a network associated with effecting a service in the network;
   create and store at the computing device a plurality of views of a model of the service, wherein the model includes the service information, wherein at least one of the plurality of views is associated with a respective subsystem in the network and includes portions of the service information specific to the respective subsystem to effect the service, and wherein the at least one of the plurality of views is representative of the functionality the respective subsystem provides as well as interfaces and attributes common between the respective subsystem and other network components with interfaces to the respective subsystem; and
   transmit from the computing device at least one of the plurality of views to the respective subsystem, and
   wherein the individual ones of the plurality of views are configured for use by the respective subsystem:
      to interpret the individual ones of the plurality of views to define actions of the respective subsystem with respect to the new or modified service to define attributes to be communicated between the respective subsystem and the network, and
      to determine integration of the new or modified service at the respective subsystem with respect to the network.

37. The tangible computer-readable medium of claim 36, further comprising instructions that cause the computing device to perform operations comprising receipt of a request from the respectively associated subsystem prior to transmitting the one of the plurality of views.

38. The tangible computer-readable medium of claim 36, further comprising instructions that cause the computing device to perform operations comprising receipt of the plurality of views of the model from a service model designing apparatus.

39. The tangible computer-readable medium of claim 36, wherein the service information includes information on related services which are effected upon the service being effected, wherein the service information includes related services provided by different vendors.

40. The tangible computer-readable medium of claim 36, wherein the interfaces are defined as common interfaces between the respective subsystem and additional components in the network, wherein the service information includes the additional components provided by different vendors.

41. The tangible computer-readable medium of claim 36, wherein the attributes are defined as attributes transferred between the respective subsystem and the additional components.

42. The tangible computer-readable medium of claim 36, further comprising instructions that cause the computing device to interpret the at least one of the plurality of views to define the subsystem's actions with respect to a new service at the subsystem.

* * * * *